J. L. & E. C. TERRY.
HOPPLE.
APPLICATION FILED JUNE 3, 1910.
985,472.
Patented Feb. 28, 1911.
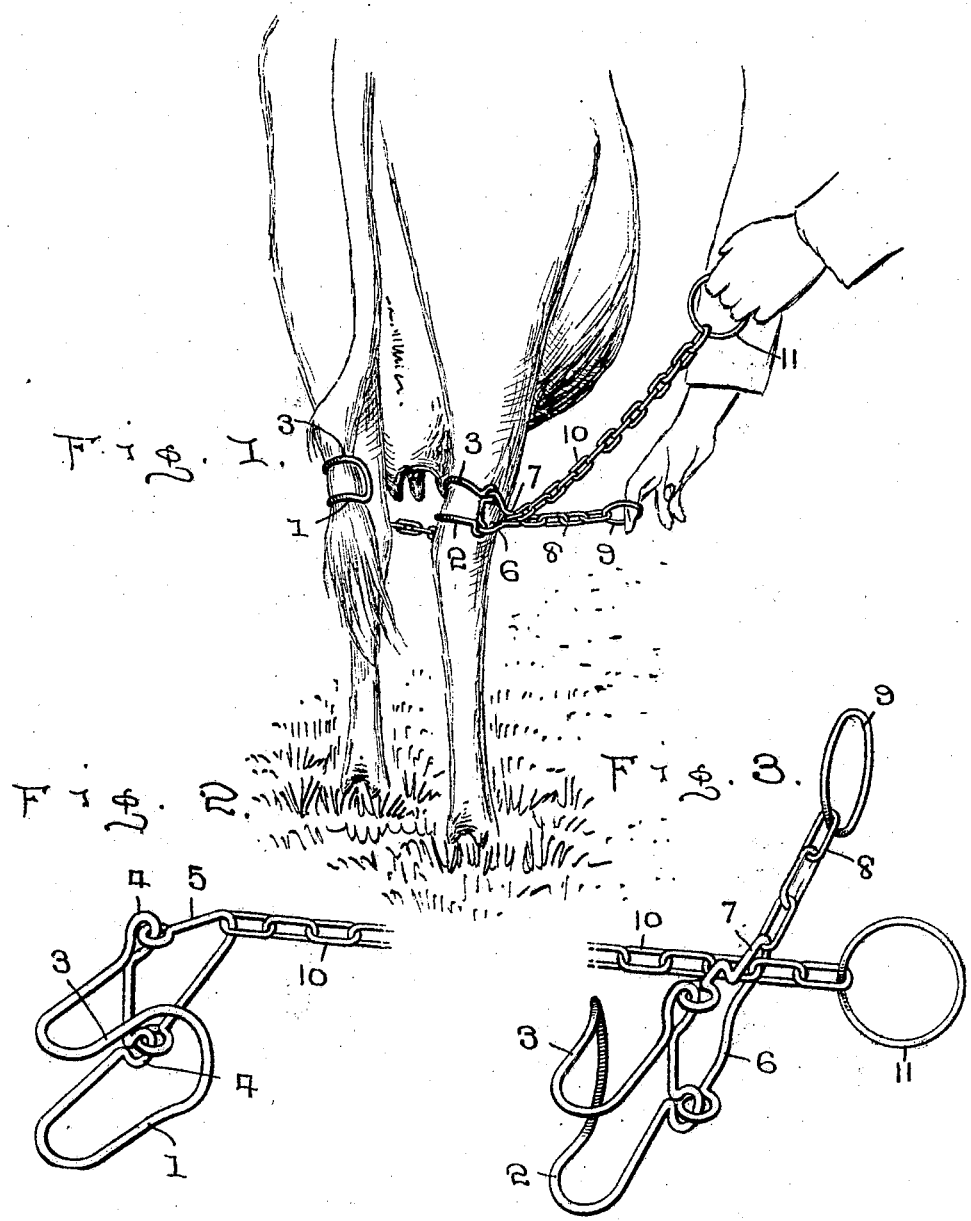
WITNESSES:
INVENTORS
J. L. Terry
E. C. Terry
BY
W. J. Fitzgerald
Attorneys

UNITED STATES PATENT OFFICE.

JAMES L. TERRY AND ERVIN C. TERRY, OF LISBON, IOWA.

HOPPLE.

985,472.

Specification of Letters Patent. Patented Feb. 28, 1911.

Application filed June 3, 1910. Serial No. 564,799.

*To all whom it may concern:*

Be it known that we, JAMES L. TERRY and ERVIN C. TERRY, citizens of the United States, residing at Lisbon, in the county of Linn and State of Iowa, have invented certain new and useful Improvements in Hopples; and we do hereby declare the following to be a full, clear, and exact description of the invention, such as will enable others skilled in the art to which it appertains to make and use the same.

Our invention relates to new and useful improvements in hopples and our object is to provide means for securing the legs of an animal to prevent the animal from kicking.

A further object is to provide means for adjustably attaching the devices to the legs of the animal, and, a further object is to provide means for holding the tail of the animal to prevent switching thereof.

Other objects and advantages will be hereinafter referred to and more particularly pointed out in the specification and claims.

In the accompanying drawings which are made a part of this application, Figure 1 is a perspective view showing the hopple applied to use. Fig. 2 is a perspective view of one portion of the hopple, and, Fig. 3 is a perspective view of the opposite portion of the hopple.

Referring to the drawings in which similar reference numerals designate corresponding parts throughout the several views, 1 and 2 indicate shackles, which are preferably formed of endless pieces of wire and substantially in the form of a link, one end of the link being curved to form a hook 3, while the opposite end thereof is bent to form eyes 4.

Secured to the eyes of the shackles are loops 5 and 6 respectively, the loop 5 being substantially V shaped, while the loop 6 is provided with a restricted end 7 and to the restricted end is attached a chain 8, the outer end of the chain having a ring 9 attached thereto. The loop 5 also has attached thereto a chain 10, which is adapted to extend through the loop 6 and said chain is also provided with a ring 11 at its free end.

In applying the hopple to use, the shackles 1 and 2 are engaged with the rear legs of the animal and preferably just above the knee joint thereof, while the chain 10 is passed in front of the legs of the animal and introduced through the loop 6. The ring 9 of the chain 8 is then grasped in one hand and the ring 11 in the other, when a pull is given to the chain 10 and the loop 6 held in fixed position by the chain 8. This operation will draw the legs of the animal close together and when properly positioned, one of the links of the chain 10 is moved into the restricted portion 7 of the loop 6, thereby securely locking the shackles together.

Before applying one of the shackles, the switch portion of the tail of the animal is entered in the hook portion thereof, so that when the shackle is drawn on to the leg of the animal, the tail will be securely held against swinging movement, thereby forming a combined hopple and tail holding device.

The ends of the shackles forming the hooks are preferably slightly curved outwardly so that they will readily pass on to the leg of the animal and by forming the shackles of wire, they will readily yield to fit the legs of different sized animals.

It will also be seen that by engaging the shackles with the rear portions of the legs and passing the chain forwardly of the legs that the shackles will remain securely locked together until such time as it is desired to remove the same.

It will further be seen that as the shackle portions of the device are formed of wire, they can be very cheaply constructed and at the same time rendered strong and durable and practically indestructible from use and it will further be seen that said shackles will serve to hold the tail of the animal against swinging movement, as well as preventing kicking of the animal.

What we claim is:—

1. The herein described hopple, comprising a pair of shackles formed of endless pieces of wire, one portion of the shackles being bent to form hooks, while the opposite ends are provided with eyes, loops engaged with said eyes, one of the loops having a restricted portion, a chain connected to said restricted portion and a similar chain engaged with the opposite loop and passing through the loop having the restricted portion, whereby when one of the links of the last mentioned chain is engaged with the restricted portion, the shackles will be locked together.

2. A hopple, comprising a pair of shackles, loops attached to said shackles, one of said loops having a restricted end, a chain connected to said restricted end and a similar chain attached to the opposite loop and passing through the loop having the restricted end, whereby when one of the links of the latter chain is engaged with the restricted portion, the shackles will be locked together.

In testimony whereof we have signed our names to this specification in the presence of two subscribing witnesses.

JAMES L. TERRY.
ERVIN C. TERRY.

Witnesses:
ELLIS E. TERRY,
GEO. A. PATTERSON.